United States Patent [19]

Cutore

[11] 4,258,744
[45] Mar. 31, 1981

[54] VERTICALLY MOVABLE APPARATUS FOR FLUID DELIVERY FROM STATIONARY SOURCE

[76] Inventor: Gaetano Cutore, Via Asmara 33, Rome, Italy

[21] Appl. No.: 11,486

[22] Filed: Feb. 12, 1979

[30] Foreign Application Priority Data

Feb. 15, 1978 [IT] Italy ................................ 48064 A/78

[51] Int. Cl.³ ............................................. B67D 5/04
[52] U.S. Cl. .................................. 137/355.27; 137/363
[58] Field of Search ..................... 137/355.26, 355.27, 137/363

[56] References Cited

U.S. PATENT DOCUMENTS

| 1,867,602 | 7/1932 | Stukenborg | 137/363 X |
| 2,225,622 | 12/1940 | Clapp | 137/363 |
| 3,970,103 | 7/1976 | McKee | 137/357 |

*Primary Examiner*—Gerald A. Michalsky
*Attorney, Agent, or Firm*—Brooks, Haidt, Haffner & Delahunty

[57] ABSTRACT

A unit for connecting a stationary source of a fluid under pressure through a delivery apparatus vertically movable in respect thereto is disclosed. The system is especially suitable for supplying fuel under high pressure to an airplane refuelling hose.

6 Claims, 4 Drawing Figures

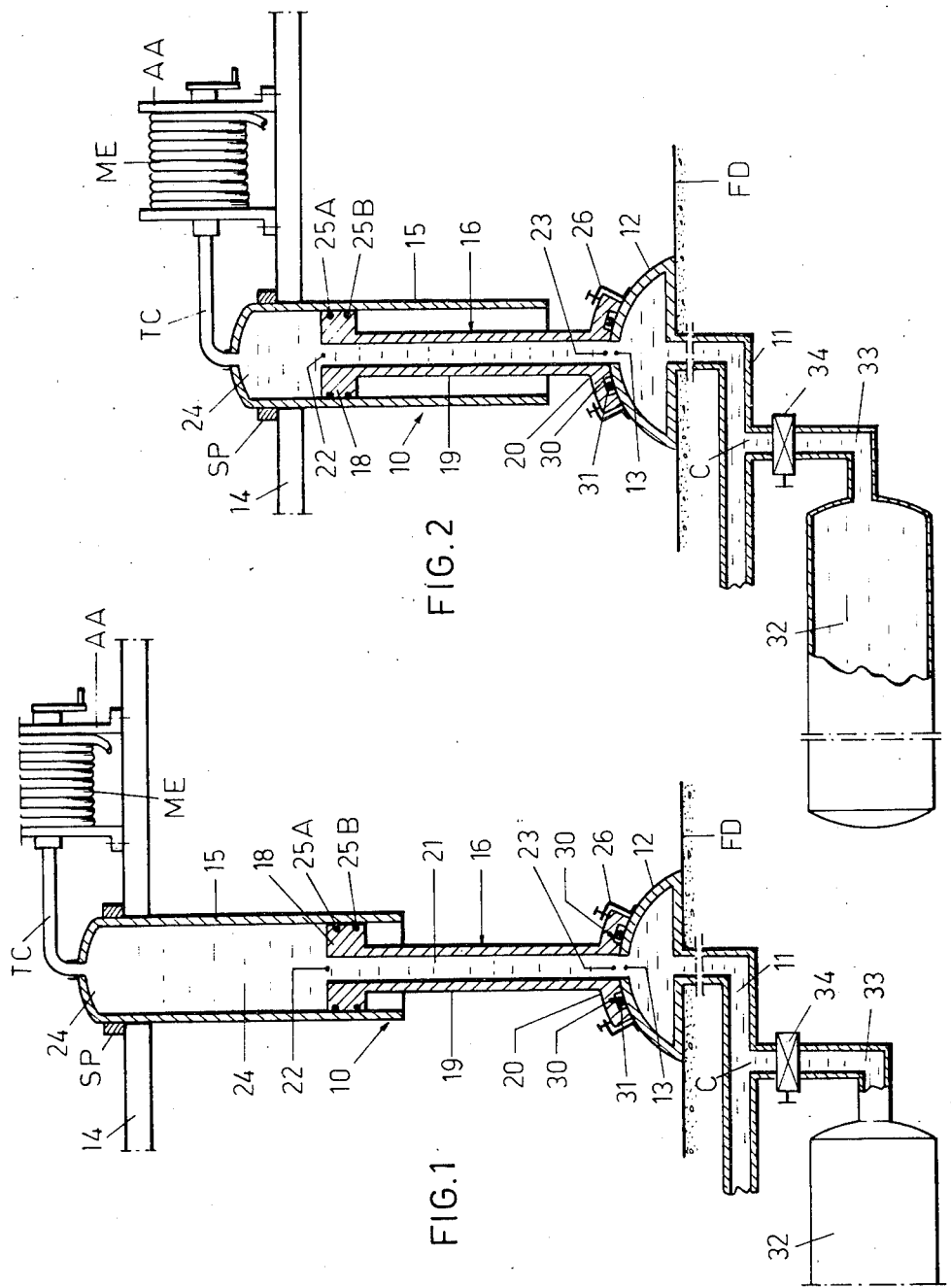

VERTICALLY MOVABLE APPARATUS FOR FLUID DELIVERY FROM STATIONARY SOURCE

This invention refers to a connecting unit of a variable length adapted to allow a fluid under pressure to be supplied from a stationary source to a dispensing apparatus vertically movable in respect to the stationary source.

A system of this type is specifically, but not exclusively, applied for supplying fuel under high pressure to an airplane refuelling hose mounted on a platform vertically movable in a pit from a lowered inoperative position to a raised operative position relative to a fuel intake within the pit connected to a central tank.

At present, these installations are widely used in airports for refuelling the aircrafts and they are mainly characterized in that they require to deliver large amounts of fuel under very high pressure.

Heretofore, this problem is mainly delt with by connecting the main tube with the secondary tube, or with each secondary tube, through a length of a flexible tube having a given length and being hermetically connected at one end thereof to the main supply tube and at the other end thereof to the secondary tube.

These well-known flexible tubes are also a source of serious drawbacks, such as splitting and bursting, to which they are subjected in operation, particularly in case of delivery of large amounts of fuel when such delivery is performed under high pressures.

It is an object of the invention to provide an extensible unit of completely new design and construction which allows the stationary source of fuel under pressure to be connected safely, permanently and reliably with the delivery apparatus provided with a hose and mounted on the movable platform.

According to the invention, the stationary fuel intake or source connected to the delivery pump placed downstream of the general tank and arranged below the movable platform comprises a terminal head, having the shape of a hemisphere or a spheric segment, made of a strong metal sheet and having a central opening.

The connecting unit essentially comprises an extensible cylinder and piston unit of a particular type wherein the piston, having a head hermetically sliding within the cylinder, has a hollow stem of large diameter. The bore of the stem is connected, through the piston head suitably apertured, to the chamber of variable capacity defined within the cylinder by the position of the piston head.

In the presently preferred embodiment of the invention, the cylinder is on the platform and it is connected to the hose delivery apparatus and the piston is provided with a concave "foot" hermetically connected to the terminal head. This foot is apertured in correspondence to the head aperture and accordingly the tube from the main tank-delivery pump unit, the terminal head thereof the bore of the piston stem, the inner chamber of the corresponding cylinder and the hose delivery apparatus, carried by the movable platform, are uninterruptly connected for any position of the platform in respect to the stationary intake.

As a matter of fact, any raising of the platform in respect to the bottom of the pit and then to the terminal head is allowed by a corresponding increase in the length of the unit comprising the hollow piston and cylinder, without any interruption in the supply of the circuit, due to the reciprocal sliding movement of the two elements.

The invention also provides for two different technical solutions to the problem concerning the decrease in the overall capacity of the cylinder-piston unit upon lowering of the platform.

Any lowering of the platform results of course in a retraction of the hollow piston into the relative cylinder with a consequent decrease in the overall capacity of the unit and, thereupon, in the necessity of accommodating the exceeding fluid, which is a fluid under high pressure (usually 156,46 psi). This fuel is incompressible and cannot be returned to the central tank through the pump since in this case the operation of the pump should be discontinued, which is not always possible because a single pump supplies a plurality of delivery platforms.

The first solution according to the invention consists in a compensating chamber connected to each terminal head and provided with an electrovalve that is automatically opened upon operation of the lowering control of the platform.

The second solution consists in a bypass on the delivery pump for each supply tube, provided with a pressure controlled valve. This valve automatically opens, allowing the fuel to flow in the opposite direction, i.e. from the supply tube to the main tank, any time that an overpressure is generated in the supply tube, as in the case where the corresponding platform is lowered.

The invention will be now described in detail with reference to the annexed drawings, wherein:

FIG. 1 is a fragmentary diagrammatic axial section view of the unit according to the invention in the extended condition thereof, the unit being shown as provided with an auxiliary chamber adapted to compensate the decrease in the volume of the unit;

FIG. 2 is a section view similar to the view shown in FIG. 1 with the unit in the retracted condition;

Figure 4:
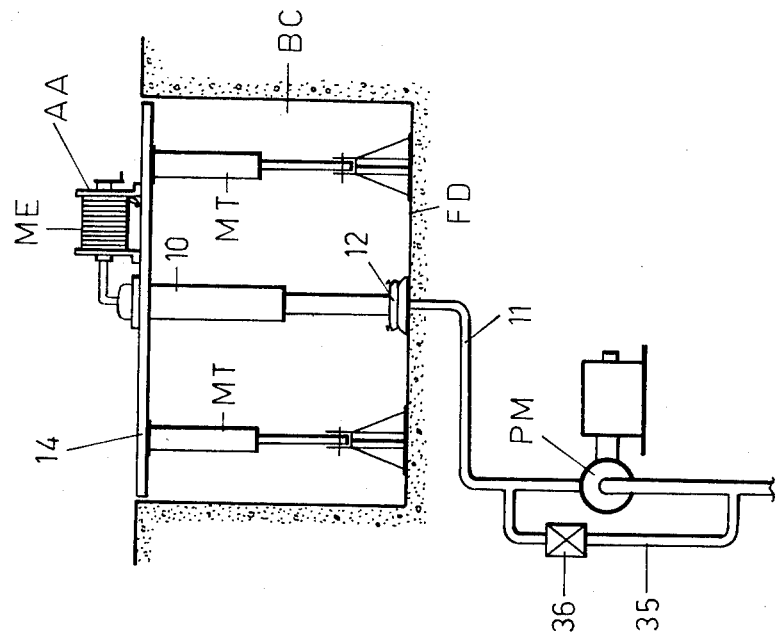
FIG. 4 is an elevation view showing schematically the unit according to the invention, provided with a second embodiment of the means intended to compensate the decrease in the capacity of the unit according to the invention.

Particularly with reference to FIGS. 1, 2 and 4, the connecting unit according to the invention, generally indicated with 10, is adapted to connect a supply tube 11, ending by a hemispheric head 12 provided with a central opening 13, to a delivery hose ME wound on reel AA which is mounted on platform 14.

Although it is not relevant for the purposes of the invention, it should be noted that: platform 14 is usually vertically movable in a pit BC (FIG. 4); tube 11 is underground and hemispheric head 12, with which tube 11 ends, protrudes from bottom FD of pit BC.

Unit 10 comprises a cylinder 15 and a piston 16 having a piston head 18, a piston stem 19 and a piston foot 20. Piston stem 19 is completely hollow and bore 21 thereof is ending upwardly at 22 on top of piston head 18 and downwardly at 23 in the bottom of foot 20. Cylinder 15 is anchored on platform 14, for example through bracket SP and, accordingly, it moves therewith.

Head 18 of piston 16 slides within inner bore 24 of cylinder 15, in hermetical relationship therewith, owing to seals 25A, 25B. Foot 20 of piston 16 is shaped as a spheric segment and its inner surface perfectly matches the spherical outer surface of head 12 secured to the bottom of pit BC. Moreover, foot 20 engages the top of spherical head 12 so that openings 13 and 23 correspond to each other, the relative movement of foot 20 over head 12 being limited by a plurality of L-shaped stopping elements 26 of adjustable heigth welded to the outer surface of spherical head 12 and uniformly spaced around the circumference of opening 13.

It can be noted that L-shaped stopping elements 26 "embrace" the peripheral head of piston foot 20 that is thus allowed to perform angularly limited rotations in respect to head 12, but substantially preventing piston foot 20 from axially moving away from head 12.

Accordingly, it is evident from FIGS. 1 and 2 that the unit according to the invention connects supply tube 11 to delivery hose ME through head 12, opening 13, opening 23, bore 21, opening 22, bore 24 and connecting tube TC, which tube connects cylinder 15 to reel AA of hose ME.

It should be noted that the above-described construction allows unit 10 to perform the limited rotations in respect to head 12, caused by the inevitable variations in the inclination of platform 14 during the raising and lowering movements thereof. O-ring or toroidal seal 30 received within groove 31 on the inner surface of foot 20 assures a fluid-tight engagement of head 12 with foot 20 in respect to any angular movement of foot 20.

The operation of the connecting unit according to the invention will be readily understood from the above description of the construction thereof. Cylinder 15 follows the vertical movements of plaform 14 sliding in respect to piston 16, the foot 20 of which is anchored to head 12 through L-shaped elements 26 and the above-described connection between supply tube 11 and delivery hose ME is assured in any case by the extensible construction of the unit.

It is evident however the problem that arises from the decrease in the volume of unit 10 which occurs when the platform is lowered from the position shown in FIG. 1 to the position shown in FIG. 2.

Figure 3:
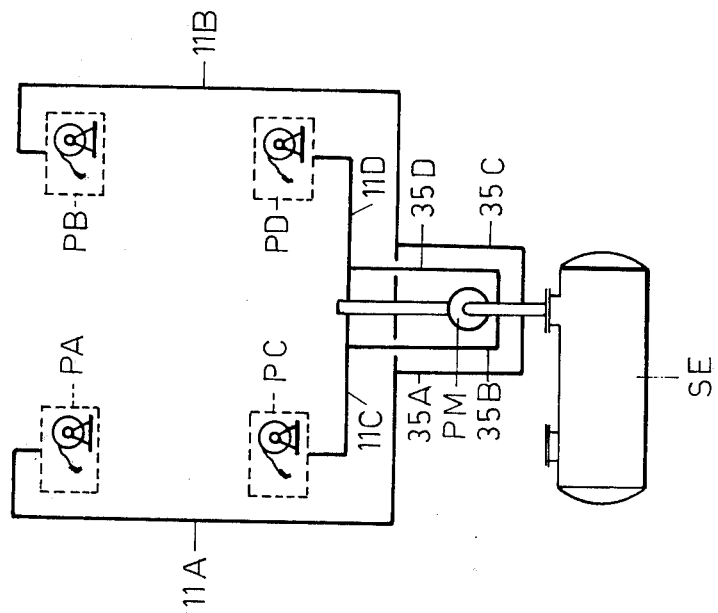
FIG. 3 is a diagrammatic top view, in smaller scale, of a system comprising four platforms and provided with delivery units according to the invention and supplied by a central tank and pump.

Fuel C is incompressible and it is under a high pressure in the circuit (about 156,46 psi) and for the above-mentioned reasons, such as the possible operation of pump PM for refuelling platform PA (FIG. 3), the fuel cannot return into tank SE through the pump while platform PC is being lowered.

This problem is solved in the unit according to the invention with two possible embodiments of a means adapted to compensate such decrease in volume.

According to the first embodiment (FIGS. 1 and 2) tube 11 is connected to a compensating tank 32 through a duct 33 provided with an electrovalve 34.

When supporting jacks MT of platform 13 are operated downwardly, an opening signal is applied to electrovalve 34, which electrovalve is always closed during the delivery of fuel under pressure, thus the amount of fuel now exceeding the capacity of the circuit, due to the reduction in the volume of chamber 24, is allowed to enter tank 32. This exceeding fuel will be discharged from tank 32 owing to its own pressure, through the automatic re-opening of valve 34, upon the next raising of platform 14.

According to the second embodiment (FIGS. 3 and 4) each supply tube 11 (A, B, C, D) is provided with a bypass 35 (A, B, C, D) on pump PM, which bypass 35 is provided, in turn, with a pressure responsive valve suitably set.

When platform 14 is lowered, the overpressure generated within tube 11 by the reduction in the volume of chamber 24 results in the opening of valve 36 and the return of the exceeding amount of fuel into tank SE, bypassing pump PM.

I claim:

1. A unit for connecting a stationary source of a fluid under pressure to a delivery apparatus vertically movable in respect thereto; wherein said stationary source comprises the end means of a tube supplying the fluid from a tank through a supply pump, and said delivery apparatus comprises a fluid delivery hose means wound on a convenient reel mounted on a platform vertically movable thereabove from an inoperative lowered position to a plurality of raised delivery positions and vice-versa, said unit comprising: end connecting means integral with said supply-tube end means; two hollow members telescopically sliding in respect to each other and having the respective bores communicating with each other in fluid pressure tight relationship, one hollow member being anchored to said platform, to move bodily therewith, and connected to said delivery hose means and said other hollow member being secured on said supply-tube end means and provided with matching connecting means adapted to engage said end connecting means of said supply-tube end means, in order to connect said supply tube to said communicating bores of said two hollow members; sealing means arranged between said end connecting means and said matching connecting means, in order to assure a fluid pressure tight connection therebetween; stop means provided on said supply-tube end means to prevent said other hollow member from moving axially away from said supply tube end, yet permitting limited rotations in respect thereto; lowering and raising means supporting said platform; control means controlling said raising and lowering means; and pressured fluid receiving means adapted to accommodate the exceeding fluid under pressure due to the decrease in the overall capacity of the hollow members caused by the lowering of said platform.

2. The unit according to claim 1, wherein said end means of said supply tube comprises a centrally apertured head having the shape of a spheric segment.

3. The unit according to claim 2, wherein said matching connecting means of said second hollow member comprises an circular concave foot centrally apertured, the concavity of said foot being of a diameter identical with the external diameter of said head and adapted to engage the same, said two apertures being corresponding to each other.

4. The unit according to claim 3, wherein said sealing means comprises an annular groove formed in the concavity of said foot and an O-ring received therein and protruding therefrom to engage the outer surface of said apertured head around said central aperture, in fluid pressure tight relationship.

5. Unit according to claim 4, wherein said stop means comprise a plurality of L-shaped bracket elements uniformly spaced along a parallel having a diameter slightly wider than the diameter of said circular piston foot, each bracket element having one arm perpendicular to the surface of said head and the other arm oriented according to the respective meridian and embracing the periphery of said circular piston foot to prevent said foot from moving axially away from said head yet permitting limited rotations thereof.

6. The unit according to claim 1, wherein said hollow members telescopically sliding in respect to each other comprise a hydraulic cylinder-and-piston unit, the piston of which has an apertured head and a hollow stem of large diameter, in which the bore of said hollow stem communicates with the bore of said cylinder through said apertured head.

* * * * *